2,805,158

PROCESS FOR COLOUR PHOTOGRAPHY

Karl Otto Ganguin and Eric Macdonald, Blackley, Manchester, England, assignors to Imperial Chemical Industries Limited, a corporation of Great Britain No Drawing. Application October 1, 1953,
Serial No. 383,697

Claims priority, application Great Britain
October 11, 1952

14 Claims. (Cl. 96—55)

This invention relates to a process for colour photography and more particularly to a process for colour correction in colour photography.

The dyestuffs and pigments used in practice in subtractive processes of colour photography do not possess ideal spectral absorption curves. In addition to absorbing light in the desired part of the spectrum, they also absorb some light in other parts of the spectrum and as a result of this the colour reproduction is never ideal. For example, cyan dyestuffs formed by colour development from colour formers of the 1-naphthol series absorb the desired complementary coloured red light and in addition absorb undesirably a certain amount of blue and green light. It has been proposed to correct for these deficiencies by the use of an automatic masking method whereby coloured colour formers are used, the light absorption of the colour former being equal or approximately equal to the undesired light absorption of the developed dyestuff. For example the colour former which is used in a photographic layer to form a cyan dyestuff on colour development may itself be coloured orange or red so that it absorbs blue and green light at an intensity equal to the undesired blue and green absorption of the cyan dyestuff formed by colour development. Accordingly the unchanged colour former itself forms the coloured mask and the blue and green absorption of the photographic layer is a constant value (irrespective of the red absorption of the cyan image) which can be compensated for by using a suitable filter when printing.

The coloured colour formers it has been proposed to use in the above process for forming a mask in the cyan layer are azo compounds containing the group —N=N—R where R is an aromatic or heterocyclic radical. The —N=N—R group is split off during the development with an aromatic amino compound and replaced by the phenylimino radical derived from the aromatic amino compound.

The main practical objection to the use of the coloured colour formers hitherto known for use in this automatic masking method for the cyan layer is that the reaction of such colour formers with the primary aromatic amino compounds used for development is undesirably slow.

It is known that in a multilayer photographic colour negative formed by colour development of a film containing colourless colour formers, an orange-red masking image can be formed in the cyan layer by coupling the residual colour former with a diazonium compound but it is not possible to form an azo dyestuff of the required shade in the cyan layer without simultaneously coupling the unchanged colour former in the yellow layer to form a compound which reduces the contrast and definition of the yellow image.

We have now discovered a new reaction by means of which it is possible to form a masking image from residual colourless colour former in the cyan layer by processing steps which are simple in operation and which do not undesirably affect the primary or masking images in the other layers of a multilayer film.

The colourless colour formers used in the cyan layer in the process of our invention are phenols and 1-naphthols which are unsubstituted in the 4-position to the hydroxyl group. The colour formers can be substituted in other positions for example in the 2-position with for example an amide group to which there may be attached a water-solubilising group and a radical which makes the colour former non-diffusible in gelatin emulsion, for example, an alkyl chain containing at least 5 carbon atoms. Alternatively the colour formers can be free from water-solubilising groups, these colour formers being incorporated in the cyan layer in a dispersed form, or they can be water-soluble compounds without substituents rendering them non-diffusible in gelatin emulsion which compounds may be contained in dispersed resin particles in the cyan layer. As examples of suitable colour formers there may be mentioned 1-hydroxy-2-naphthoylamino-2'-(N-methyl-N-octadecylamino)-benzene-5'-sulphonic acid and the corresponding carboxylic acid, 1-hydroxy-2-naphthoylamino - 4' - (N-octadecylamino)-benzene-2'-sulphonic acid, 1-hydroxy-2-naphthoylamino-3'-(N-stearoylamino)-benzene-5'-sulphonic acid, 1-hydroxy-2-naphthoylamino - 2'- methyl-3'-(N-stearoylamino)-benzene-5'-sulphonic acid, and 1-hydroxy-2-naphthoyl-4'-(N-stearoylamino)-6'-sulpho-2'-naphthylamine. Such colour formers give cyan dyestuffs on colour development with a substituted p-phenylene-diamine and we have found that they are converted to yellow, orange, red or magenta dyestuffs by our new reaction.

According to our invention we provide a process for the colour correction of a cyan coloured colour photographic image layer formed by exposing a light-sensitive layer containing a cyan colour former, as hereinbefore defined, to the light from a coloured object, colour developing to form a cyan image in the exposed parts of the layer and bleaching and fixing the developed silver, which comprises treating the layer at any stage subsequent to the colour development, with formaldehyde in the presence of a primary aromatic amine to form the leuco derivative of a masking dyestuff by reaction with the residual colour former in the unexposed parts of the layer and subsequently oxidising this leuco derivative to form the colour correcting masking dyestuff image.

The formaldehyde may if desired be formed in situ in the processing solution.

It is suggested as a possible theory of the process of our invention that the leuco dyestuff is formed by reaction of the residual colour former with formaldehyde and the amine $RNH_2$ in such a way that the radical —$CH_2$—NHR is introduced into the 4-position of the colour former and on oxidation this is converted to the radical —CH=NR.

The process of our invention is especially valuable for use in the colour correction of the cyan layer of a multi-layer photographic material containing yellow, magenta and cyan images in three separate layers and obtained by exposure and development of a multilayer film comprising three differently sensitised emulsion layers containing colour formers.

According to a further feature of our invention, we provide a colour photographic element comprising a layer containing a cyan coloured image and a yellow, orange, red or magenta coloured masking image formed with a dyestuff obtainable by the process of our invention.

If desired the treatment with formaldehyde can be effected immediately after colour development by adding formaldehyde to the stop bath used after the development step; and the amine used can be the residual aromatic amine used as colour developer which is left in the layer. Alternatively an aromatic amine different from that used in the colour development or a mixture of amines may be used when necessary to produce a masking image of the desired shade and intensity. Such amine or mixture of amines may be added together with the aldehyde to the stop-bath. Alternatively the treatment with formaldehyde and amine or amines may be effected at a later stage of the processing. Control of the shade and intensity of the masking image may also be obtained by using suitable mixtures of p-phenylenediamine at the development step.

When the layer is treated with formaldehyde and an amine before the silver bleaching step, the leuco derivative of the dyestuff formed can be conveniently oxidised in the bleaching bath to form the oxidised form of the dyestuff. Alternatively the oxidation may be effected with any known oxidising agent which does not adversely affect the dyestuff images or other parts of the photographic element, for example ammonium persulphate.

The shade of the masking image can be varied by varying the aldehyde and amine combination used with any particular colour former. For example when the colour former is 1-hydroxy-2-naphthoylamino-2'-(N-methyl-N-octadecylamino)-benzene-5'-sulphonic acid and formaldehyde is used, the colour of masking image obtained with different amines is shown in the following table:

| Amine | Colour of Masking Image Dyestuff |
| --- | --- |
| p-N:N-diethylamino-aniline | reddish-magenta. |
| p-N-ethyl-N-hydroxyethyl-amino-aniline | Do. |
| p-aminophenol | yellowish-orange. |
| 2-methyl-4-(N-ethyl-N-methylsulphonamidoethyl-amino)-aniline. | orange-red. |
| 2-methyl-4-(N-ethyl-N-hydroxyethyl-amino)-aniline. | yellowish-orange. |
| p-phenylene-diamine | reddish-magenta. |
| 2-methyl-4-N:N-diethylamino-aniline | yellowish-orange. |
| 2-ethoxy-4-N:N-diethylamino-aniline | yellow. |

The tinctorial strength of the dyestuffs obtained varies with the amines used, so that the intensity of the masking image as well as the shade can be varied as required by choice of a suitable amine. The intensity of the masking image can also be varied by using a mixture of a cyan colour former of the kind hereinbefore defined, with a second cyan colour former which contains a substituent such as a halogen atom or a sulphonic acid group in the 4-position with respect to the hydroxyl group. Such 4-substituted cyan colour formers, for example the colour former obtained by condensing 1-hydroxy-2-naphthoic acid chloride with octadecylamine or oleylamine and sulphonating, do not give coloured products when treated with an aldehyde and an amine according to our invention, and accordingly, by increasing the proportion of such 4-substituted cyan colour former used in the mixture, the intensity of the masking image can be reduced to any desired value, without appreciably affecting the intensity of the primary cyan image.

It will be apparent that the process of the present invention can be applied to the cyan layer of a multilayer photographic element in which one or more other layers have been or are to be colour corrected. For example, the process of the present invention may be applied to the cyan image layer of a film carrying a yellow image layer and a layer containing a magenta primary image together with a yellow masking image, for example a yellow styryl dyestuff masking image produced according to the process of United Kingdom specification No. 651,059 or United Kingdom specification No. 673,091.

The process of the invention can be applied, if desired, in reversal processing.

The invention is illustrated but not limited by the following examples in which the parts are by weight:

Example 1

A multilayer light-sensitive material is made up as follows:

A transparent support material is coated with a layer of red sensitive gelatino-silver halide emulsion containing 10 grams per litre of the sodium salt of 1-hydroxy-2-naphthoylamino-2'-(N-methyl-N-octadecyl-amino)-benzene-5'-sulphonic acid. Upon this layer there is coated a green sensitive gelatino-silver halide emulsion containing 10 grams per litre of the sodium salt of the yellow styryl dyestuff 1-(4'-phenoxy-3'-sulphophenyl)-3-heptadecyl-4-$\beta$:$\beta'$-dicyanodiethyl-amino-benzylidene-5-pyrazolone which serves as a magenta colour former. A layer of colloidal silver in gelatin is now coated on to act as yellow filter layer and finally as the top layer there is coated a blue sensitive gelatino-silver halide emulsion containing 10 grams per litre of the sodium salt of 3-(p-anisoylacetamido)-4-(N-methyl-N-octadecylamino)-benzoic acid. The film is exposed to the light from a coloured object and then developed in a solution of the following composition:

| | Parts |
| --- | --- |
| p-(N-ethyl-N-hydroxyethyl-amino)-aniline sulphate | 2 |
| Sodium sulphite anhydrous | 2 |
| Hydroxylamine hydrochloride | 1 |
| Sodium carbonate anhydrous | 30 |
| Potassium bromide | 0.5 |
| Water to make up to | 1000 |

The film is then transferred to a stopbath of the following composition:

| | Parts |
| --- | --- |
| Acetic acid glacial | 10 |
| Sodium acetate | 20 |
| 37% formaldehyde solution | 20 |
| Water to make up to | 1000 |

At this stage the film contains the first developed silver, the azomethine dyestuff images in the three layers which were originally light sensitive, the yellow styryl dyestuff masking image in the magenta layer and the leuco form of the red dyestuff masking image in the cyan layer.

The material is thoroughly washed and the developed silver is bleached in a bleaching bath solution of the following composition:

| | Parts |
| --- | --- |
| Potassium ferricyanide | 100 |
| Potassium bromide | 25 |
| Sodium dihydrogen phosphate | 50 |
| Water to make up to | 1000 |

Simultaneously with the re-halogenisation of the developed silver, the leuco form of the condensation product of residual cyan colour former, formaldehyde and developer amine is converted to the red masking dyestuff.

The film is further washed, fixed in a 20% aqueous solution of sodium thiosulphate, finally washed and dried. This processed material contains in the first layer, a cyan dyestuff negative image and a red dyestuff positive image (which serves as a mask to correct for the undesired absorption of blue and green light by the cyan dyestuff), in the second layer, a magenta dyestuff negative image and a yellow styryl dyestuff positive image (which serves as a mask to correct for the undesired absorption of blue light by the magenta dyestuff), and in the top layer a yellow dyestuff negative image. When the negative transparency so obtained is used for making positive prints, duplicate negatives or separation negatives, the colour rendering is greatly improved as compared with reproductions from negative transparencies which have not been masked.

In place of the stop-bath used in the above example, there may be used a bath of the following composition:

| | Parts |
| --- | --- |
| 37% formaldehyde solution | 30 |
| Sodium carbonate, anhydrous | 10 |
| Water to make up to | 1000 |

Example 2

A multilayer light sensitive photographic material is made up as described in Example 1 and exposed to the light from a coloured object.

It is then developed in a solution of the following composition:

| | Parts |
|---|---|
| 5-diethylamino-2-amino-toluene hydrochloride | 1 |
| p-N:N-diethyl-amino-aniline hydrochloride | 1 |
| Sodium sulphite, anhydrous | 2 |
| Hydroxylamine hydrochloride | 1 |
| Sodium carbonate, anhydrous | 30 |
| Potassium bromide | 0.5 |
| Water to make up to | 1000 |

Further processing is then carried out as described in Example 1 and when used for printing the processed film gives results similar to those obtained with the processed film of Example 1.

*Example 3*

A multilayer light sensitive photographic material is made up as described in Example 1 and exposed to the light from a coloured object.

It is then developed in a solution of the following composition:

| | Parts |
|---|---|
| 5 - (N - ethyl - N - hydroxyethyl - amino) - 2-amino-toluene sulphate | 3 |
| Sodium sulphite, anhydrous | 2 |
| Hydroxylamine hydrochloride | 1 |
| Sodium carbonate, anhydrous | 30 |
| Potassium bromide | 0.5 |
| Water to make up to | 1000 |

The film is rinsed in water and transferred to a stop-bath of the following composition:

| | Parts |
|---|---|
| 37% formaldehyde solution | 20 |
| Acetic acid, glacial | 10 |
| Sodium acetate | 20 |
| p - (N - ethyl - N - hydroxyethyl - amino) - aniline sulphate | 2 |
| Water to make up to | 1000 | the washing, bleaching and fixing are then carried out as described in Example 1, and when used for printing the processed film gives results similar to those obtained with the processed film of Example 1.

*Example 4*

A multilayer light sensitive material is made up as follows:

A transparent support material is coated with a layer of red sensitive gelatino-silver halide emulsion containing 7.5 grams per litre of the sodium salt of 1-hydroxy-2-naphthoylamino - 2' - (N - methyl - N - octadecylamino)-benzene-5'-sulphonic acid and 2.5 grams per litre of the sodium salt of 1-hydroxy-4-sulpho-2-naphthoyl-amino-2'- (N - methyl - N - octadecylamino) - benzene - 5' - sulphonic acid. Upon this layer there is coated a green sensitive gelatino-silver halide emulsion containing 10 grams per litre of the sodium salt of 1-(4'-phenoxy-3'-sulphophenyl) - 3 - heptadecyl - 5 - pyrazolone. A layer of colloidal silver is now coated on to act as a yellow filter layer and finally, as the top layer, there is coated a blue sensitive gelatino-silver halide emulsion containing 10 grams per litre of 3-(p-anisoyl-acetamido)-4-(N-methyl-N-octadecyl-amino)benzoic acid.

The film is exposed to the light from a coloured object and then developed in a solution of the following composition:

| | Parts |
|---|---|
| p-N:N-diethylamino-aniline sulphate | 2.5 |
| Sodium sulphite, anhydrous | 2 |
| Hydroxylamine hydrochloride | 1 |
| Sodium carbonate, anhydrous | 30 |
| Potassium bromide | 0.5 |
| Water to make up to | 1000 |

Further processing is carried out as described in Example 1.

This processed film contains in the bottom layer a cyan dyestuff negative image and a red dyestuff positive image (which serves as a mask to correct for the undesired absorption of blue and green light by the cyan dyestuff), in the second layer a magenta dyestuff negative image, and in the top layer a yellow dyestuff negative image.

When the negative transparency so obtained is used for making positive prints, duplicate negatives or separation negatives, the colour rendering is greatly improved as compared with reproduction from negative transparencies which have not been masked.

*Example 5*

In place of the sodium salt of the cyan colour former 1 - hydroxy - 2 - naphthoylamino - 2' - (N - methyl - N-octadecylamino - benzene - 5' - sulphonic acid used in Example 4 there may be used the sodium salt of the corresponding 5'-carboxylic acid.

What we claim is:

1. A process for the colour correction of a cyan coloured colour photographic image layer formed by exposing a silver halide light-sensitive layer containing a colourless cyan colour former selected from the group consisting of phenols and naphthols unsubstituted in the 4-position to the hydroxyl group, to the light from a coloured object, colour developing to form a cyan image in the exposed parts of the layer and bleaching and fixing the developed silver, which comprises treating the layer at a stage subsequent to the colour development, with formaldehyde in the presence of a primary aromatic amine to form the leuco derivative of a masking dyestuff by reaction with the residual colour former in the unexposed parts of the layer and subsequently oxidising this leuco derivative to form the colour correcting masking dyestuff image.

2. Process according to claim 1 wherein the cyan coloured colour photographic image layer is one layer of a multilayer colour photographic film.

3. Process according to claim 2 wherein the cyan colour former contains a substituent carrying an alkyl chain of at least 5 carbon atoms.

4. A process according to claim 1 wherein the cyan colour former contains a substituent carrying an alkyl chain of at least 5 carbon atoms.

5. A process according to claim 1 wherein the cyan coloured colour photographic image layer is formed from a light sensitive layer containing in addition a member of the group consisting of a 4-substituted phenol and a 4-substituted naphthol.

6. A process according to claim 5 wherein the cyan coloured colour photographic image layer is one layer of a multilayer colour photographic film.

7. A process according to claim 1 in which the colourless cyan colour former is the sodium salt of 1-hydroxy-2 - naphthoyl amino - 2' - (N - methyl - N - octadecyl-amino - benzene - 5' - sulfonic acid and the primary amine is p - (N - ethyl - N - hydroxyethyl - amino) - aniline.

8. A process according to claim 1 in which the colourless cyan colour former is the sodium salt of 1 - hydroxy-2 - naphthoyl - amino - 2' - (N - methyl - N - octadecyl-amino) - benzene - 5' - sulfonic acid and the primary amine is a mixture of 5 diethylamino - 2 - amino - toluene and p - N,N - diethyl - amino - aniline.

9. A process according to claim 1 in which the colourless cyan colour former is the sodium salt of 1 - hydroxy-2 - naphthoyl - amino - 2' - (N - methyl - N - octadecyl-amino) - benzene - 5' - sulfonic acid, the colour developer is 5 (N - ethyl - N - hydroxyethyl - amino) - 2 - amino-toluene and wherein p - (N - ethyl - N - hydroxyethyl-amino) - aniline is added with the formaldehyde to form the leuco derivative of the masking dyestuff.

10. A process according to claim 1 in which the colourless cyan colour former is the sodium salt of 1 - hydroxy- 2 - naphthoylamino - 2' - (N - methyl - N - octadecylamino) - benzene - 5' - sulfonic acid and in addition there is present as a cyan colour former therewith the sodium salt of 1 - hydroxy - 4 - sulfo - 2 - naphthoyl - amino - 2'- (N - methyl - N - octadecylamino) - benzene - 5' - sulfonic acid and the primary amine is p - N,N - diethylamino-aniline.

11. A process according to claim 1 in which the colourless cyan colour former is the sodium salt of 1 - hydroxy- 2 - naphthoylamino - 2' - (N - methyl - N - octadecylamino) - benzene - 5' - carboxylic acid and in addition there is present as a cyan colour former therewith the sodium salt of 1 - hydroxy - 4 - sulfo - 2 - naphthoylamino - 2' - (N - methyl - N - octadecyl - amino) - benzene-5'-sulfonic acid and the primary amine is p-N,N-diethylamino-aniline.

12. A process according to claim 1 wherein the colourless cyan colour former is developed using a primary aromatic amine and the treatment with formaldehyde is carried out in the presence of a different aromatic amine.

13. A process according to claim 1, in which the colourless cyan colour former is the sodium salt of 1 - hydroxy- 2 - naphthoylamino - 2' - (N - methyl - N - octadecylamino) - benzene - 5' - carboxylic acid.

14. A process according to claim 1 wherein the cyan colored color photographic image layer is one layer of a multilayer color photographic film, the cyan color former contains a substituent carrying an alkyl chain of at least 5 carbon atoms, and the cyan colored color photographic image layer is formed from a light-sensitive layer containing in addition a member of the group consisting of a 4-sulfonic acid substituted phenol and a 4-sulfonic acid substituted naphthol.

References Cited in the file of this patent

UNITED STATES PATENTS

| | | |
|---|---|---|
| 2,306,410 | Schinzel | Dec. 29, 1942 |
| 2,357,388 | Duerr et al. | Sept. 5, 1944 |